(12) United States Patent  
Berenson et al.

(10) Patent No.: US 9,027,270 B2  
(45) Date of Patent: May 12, 2015

(54) POINT OF SALE DEVICE

(75) Inventors: Steven C. Berenson, Miami Beach, FL (US); Edson A. Mejia, Miami, FL (US); David Weck, Miami Beach, FL (US)

(73) Assignee: The Hillman Group, Inc., Cincinnati, OH (US)

( * ) Notice: Subject to any disclaimer, the term of this patent is extended or adjusted under 35 U.S.C. 154(b) by 290 days.

(21) Appl. No.: 13/100,432

(22) Filed: May 4, 2011

(65) Prior Publication Data

US 2012/0279098 A1    Nov. 8, 2012

(51) Int. Cl.  
*G09F 1/06* (2006.01)  
*G09F 1/10* (2006.01)  
*B65D 73/00* (2006.01)

(52) U.S. Cl.  
CPC .............. *G09F 1/10* (2013.01); *B65D 73/0042* (2013.01); *B65D 73/0092* (2013.01)

(58) Field of Classification Search  
CPC ..... B65D 75/36; B65D 75/366; B65D 75/327  
USPC .............. 40/124.06; 206/461, 462–468  
See application file for complete search history.

(56) References Cited

U.S. PATENT DOCUMENTS

| 4,266,666 | A  | * | 5/1981 | Kuchenbecker | 206/461 |
| 4,705,163 | A  | * | 11/1987 | James | 426/128 |
| 5,439,100 | A  | * | 8/1995 | Gordon et al. | 206/5 |
| 6,364,113 | B1 | * | 4/2002 | Faasse et al. | 206/469 |
| 7,681,733 | B2 | * | 3/2010 | Grosskopf | 206/462 |
| 2005/0103680 | A1 | * | 5/2005 | Nakatsu et al. | 206/704 |
| 2010/0108545 | A1 | * | 5/2010 | Tian | 206/216 |

* cited by examiner

*Primary Examiner* — Syed A Islam  
(74) *Attorney, Agent, or Firm* — Lowe Hauptman & Ham, LLP

(57) ABSTRACT

A point of sale device includes a card mounted on a hanger on a vertically extending mounting structure of a retail shop. The card carries a reusable storage container in which articles are stored. The container includes a body with an opening closed by a transparent, sealable, removable and re-sealable lid. The container is mounted on the card and the device is mounted on the hanger so a prospective purchaser can see the articles through the transparent lid. In one embodiment, the body includes a permanent magnet abutting the base.

20 Claims, 7 Drawing Sheets

POINT OF SALE DEVICE

FIELD OF THE INVENTION

The present invention relates generally to a point-of-sale device for an article to be sold at a retail shop, wherein the device includes a card adapted to be mounted on a horizontally extending elongated element of a vertically extending mounting structure, and more particularly to such a device wherein the card includes a reusable storage container in which the articles are stored, and the container has an opening closed by a sealable, removable and re-sealable lid.

BACKGROUND ART

One type of point-of-sale device, particularly used for hardware articles and articles used in offices, includes horizontally extending elongated hanger elements on a vertically extending mounting structure of a retail shop. The vertically extending mounting structure is usually a pegboard and the horizontally extending elongated hanger elements are rods carried by anchors on the pegboard. The point-of-sale device typically carries the article or articles in a blister pack, that is, a pocket formed by a cardboard or paperboard panel (that is, a card) and a clear preformed plastic member, or a transparent plastic bag or other similar container including a transparent portion, enabling a prospective buyer to see the article. The card also includes an opening enabling the entire point-of-sale device to be carried by the rod and enabling the point-of-sale device to be removed from the rod for inspection by a prospective purchaser.

Usually the person who wishes to obtain access to and use the purchased article carried by the point of sale device gains access to and removes the article by tearing the container from the card, to prevent further use of the point of sale device. This is true even though some of the point of sale devices include partially perforated cards behind the pocket, which perforations can be carefully opened and re-closed to permit removal of articles in the pocket and storage of articles remaining in the partially opened pocket. Thus, a person who removes some, but not all, of the articles from the pocket, and wants, in the future, the residual articles in the package to be used, must find a container to store the residual articles or risk losing the articles by leaving them loose in a tool box, on a work bench or elsewhere. Although the perforated card is re-closeable, it is not totally secure in keeping all contents inside. For instance, if a consumer at the retail store punctures the perforation and re-closes it, that closure is not secure enough to maintain the package at the store. Once the card has been punctured, the article carried by the point of sale device cannot be sold because the point of sale package would be considered to be an opened package.

We are unaware of any point of sale devices that resolve the foregoing problem. In particular, we are unaware of any point of sale devices that are hung on horizontally extending elongated hanger elements on a vertically extending mounting structure of a retail shop, wherein the point of sale device includes a container having a body including an opening closed by a re-useable sealable, removable and re-sealable lid.

It is accordingly an object of the present invention to provide a new and improved point of sale device that is adapted to be hung on a horizontally extending elongated hanger element on a vertically extending mounting structure of a retail shop.

Another object of the invention is to provide a new and improved point of sale device that is adapted to be hung on a horizontally extending elongated hanger element on a vertically extending mounting structure of a retail shop, wherein a container for articles carried by the device enables the articles to be stored after one or more of the articles has been removed from the container for use.

A further object of the invention is to provide a new and improved point of sale device that is adapted to be hung on a horizontally extending elongated element on a vertically extending mounting structure of a retail shop wherein a container for articles carried by the device includes a lid for enabling the articles to be (1) seen in the shop while hanging on the element and (2) stored after one or more of the articles has been removed from the container for use.

BRIEF DESCRIPTION

One aspect of the invention relates to a point of sale device for articles to be sold at a retail shop, wherein the point of sale device comprises a card adapted to be mounted on a horizontally extending elongated element (e.g., a hanger) of a vertically extending mounting structure of the retail shop. The card carries a reusable storage container in which the articles are stored. The container has a body including an opening closed by a sealable, removable and re-sealable lid. While the articles are stored in the container and the device is mounted on the horizontally extending elongated element, the lid is on the container.

Preferably, the lid is optically transparent and at least a portion of the lid is visible to a prospective purchaser of the articles so the prospective purchaser of the articles can see the articles through the transparent lid while the device is mounted on the horizontally extending elongated element and/or after the container has been removed from the horizontally extending element.

In one embodiment, the card includes first and second panels that are joined together, preferably by a narrow ridge. At least one of the panels, preferably the first panel, includes a first opening for receiving the elongated element and for enabling the card to be mounted on the elongated element. The second panel includes a second opening that receives and holds the container with the articles stored therein. The container is positioned in the second opening so (1) the lid bears against a face of the first panel which faces the second panel and (2) most of the container body extends beyond the second panel. The first panel also includes a third opening, which is in front of the lid. The first and second panels are folded along edges of the narrow ridge so the second panel is folded behind the first panel. The first and second panels are secured to each other so the second and third openings are arranged so at least a segment of the transparent lid and the articles in the container can be seen by the prospective purchaser through the second and third openings and the lid while the card is carried by the elongated element. Preferably, only a first segment of the lid is behind the third opening and a second segment of the lid bears against a back wall of the first card portion to assist in holding the container in place on the card.

Preferably, the perimeter of the second opening has substantially the same shape and size as the exterior perimeter of the body and the lid has an exterior perimeter that has substantially the same shape and is slightly larger in length than the perimeter of the second opening so that the container is held in place between facing walls of the first and second panels while the container is on the card.

In a preferred embodiment, a fastener, such as a staple, holds the first and second panels in the secured relationship. The fastener extends through a segment of the first panel between the first and third openings and through a region of the second panel remote from the fold line.

The above and still further objects, features, and advantages of the present invention will become apparent upon consideration of the following detailed description of specific embodiments thereof, especially when taken in conjunction with the accompanying drawings.

DETAILED DESCRIPTION OF THE DRAWINGS

Figure 1:
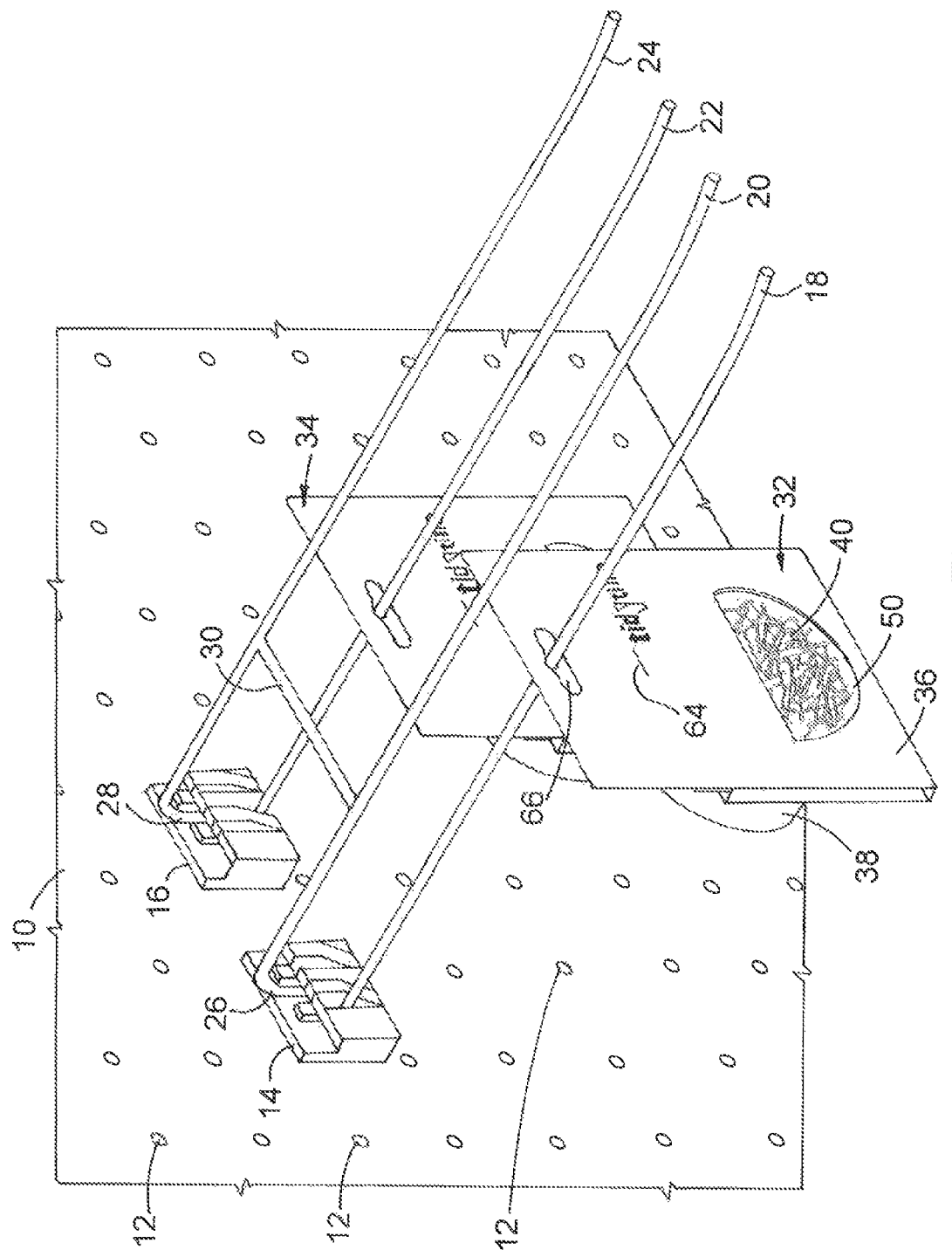
FIG. 1 is a perspective view of a pegboard carrying a horizontally extending elongated hanger element, which in turn carries a point-of-sale device in accordance with an embodiment of the present invention.
Figure 2:
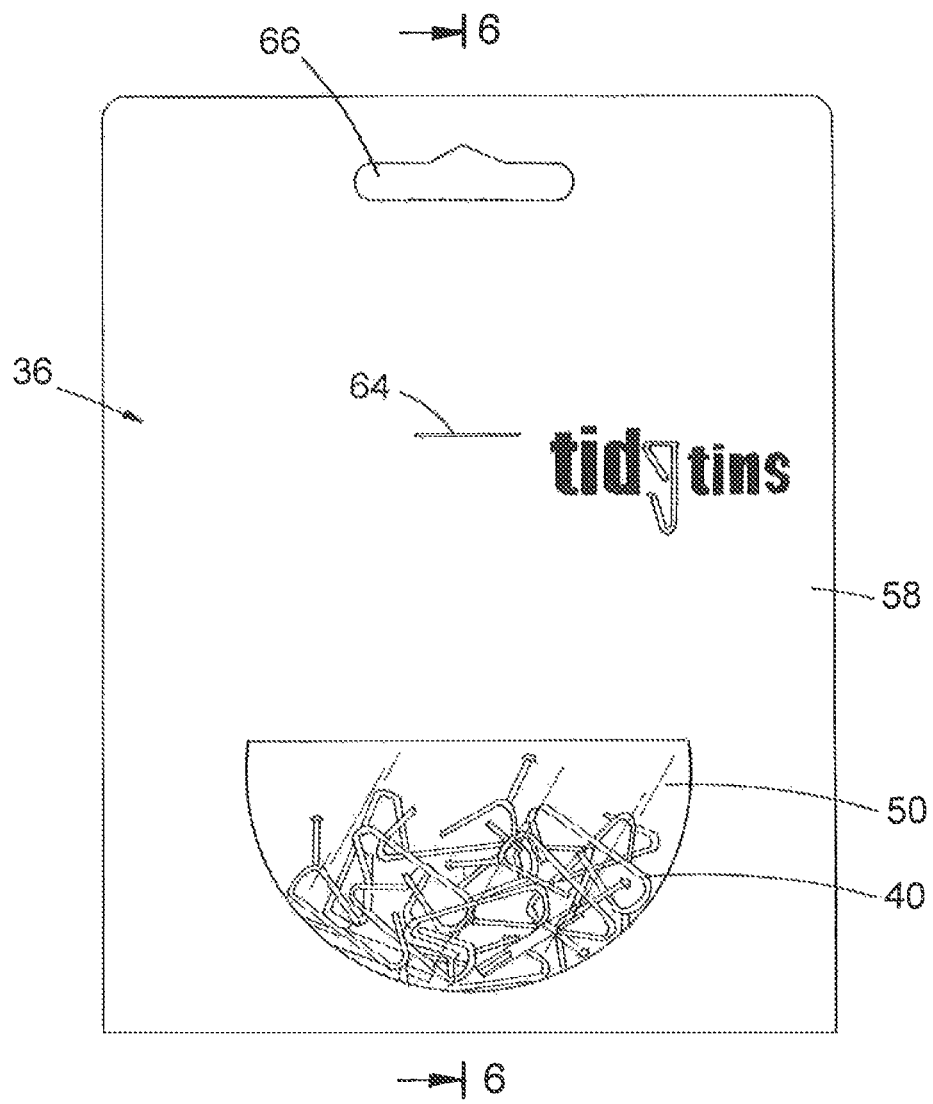
FIG. 2 is a front view of the point of sale device illustrated in FIG. 1.
Figure 3:
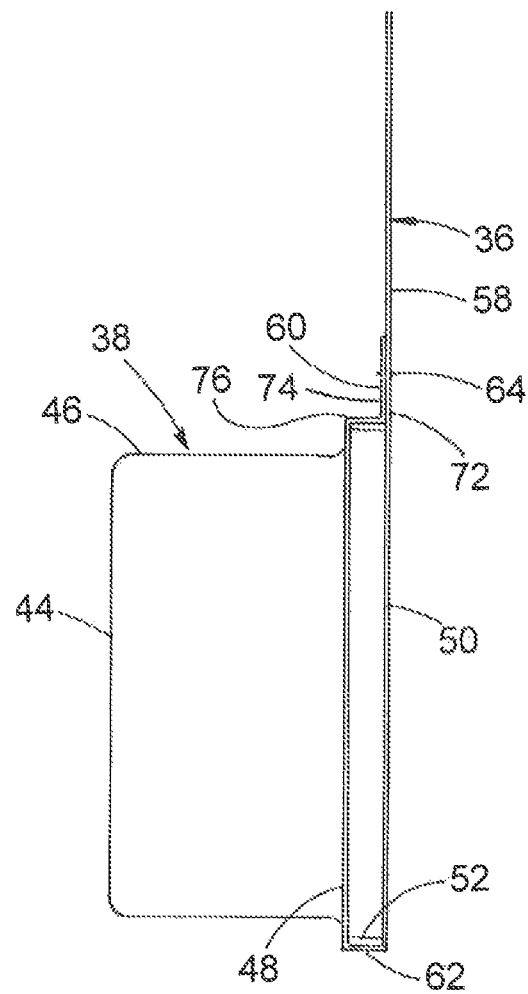
FIG. 3 is a side view of the point of sale device illustrated in FIGS. 1 and 2.
Figure 4:
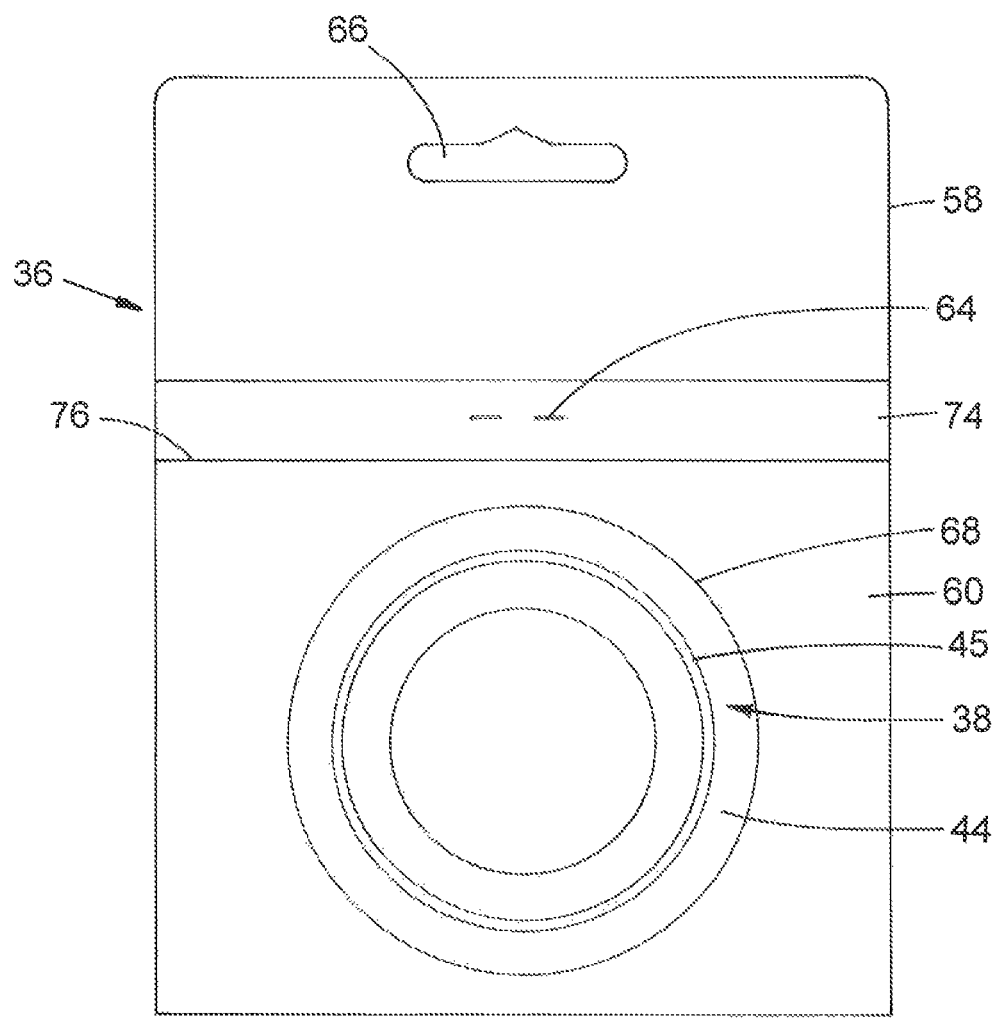
FIG. 4 is a back view of the point of sale device illustrated in FIGS. 1-3.
Figure 5:
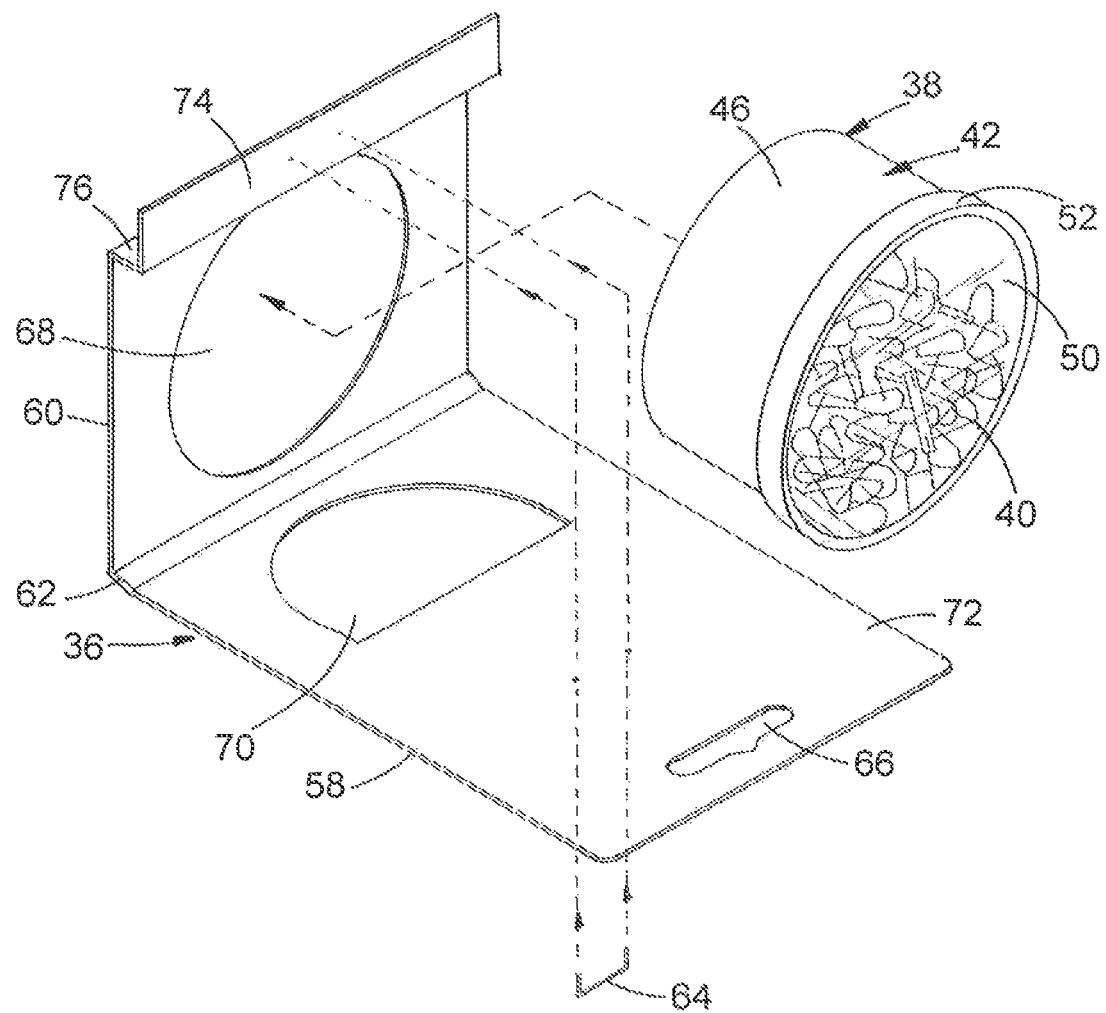
FIG. 5 is an exploded perspective view of the point of sale device illustrated in FIGS. 1-4.

The point-of-sale system of FIG. 1 is located at a retail shop, such as a hardware or office supply store, and includes vertically extending, wall-mounted pegboard 10 including circular holes 12. Pegboard 10 fixedly carries fixtures 14 and 16, on which are fixedly mounted horizontally extending elongated hanger elements in the form of rods 18, 20, 22 and 24, pairs of which are connected together by vertically extending struts 26 and 28, as well as horizontally extending strut 30. Struts 26 and 58 respectively fit into openings of fixtures 14 and 16.

Point-of-sale devices 32 and 34 contain relatively small articles of interest to prospective purchasers, such as nails, screws, metal or vinyl picture hangers, cup hooks, paper clips and paper clamps. Devices 32 and 34 are respectively hung on rods 18 and 20. Because the features of devices 32 and 34 are the same, the present detailed description of the drawings includes a description of only device 32.

Point-of-sale device 32 includes card 36, which is made of cardboard (i.e., paperboard) and is mounted on horizontally extending elongated hanger element 18. Card 36 carries reusable storage container 38 (FIGS. 1 and 3-7) in which the articles to be sold are stored. In FIGS. 1, 2 and 5-7, the articles are brass coated steel picture hooks 40, but it is to be understood that the articles can be many different relatively small objects that are for sale, as discussed above.

Container 38 has a rigid body 42, typically formed of one piece sheet steel. Body 42 includes circular base 44 having strengthening ribs 45, annular wall 46, and circular opening 48, which is parallel to and opposite base 44; thus container is effectively a steel can. Opening 48 is closed by sealable, removable, re-sealable and optically transparent lid 50, preferably made of molded polyvinyl chloride. Lid 50 includes flange 52 that fits tightly over bead 54 (FIG. 6) which extends around the end of wall 46 opposite from base 44. In one embodiment that has actually been constructed and used, base 44 has a diameter of approximately 2⅜ inches, wall 46 has a length of approximately 1¾ inches, opening 48 has a diameter of approximately 2⅝ inches and lid 50 has a diameter of approximately 2¹¹⁄₁₆ inches.

While hooks 40 are stored in container 38 and device 36 is mounted on hanger 18, lid 50 is on the container. After the consumer has purchased hooks 40 and lid 50 is opened, and some or all of the hooks have been removed from can 42, container 38 can be used to store the remaining, unused hooks and/or to store other small articles by putting lid 50 back over opening 48 so the lid is re-sealed on container body 42.

Card 36 includes first and second panels 58 and 60 that are joined together by narrow ridge 62 and secured to each other by a fastener in the form of staple 64. The first and second panels 58, 60 are folded along fold lines at opposite edges of ridge 62 so the second panel is folded behind the first panel. At least one of the panels 58, 60, preferably first panel 58, includes a first elongated, slotted opening 66 through which extends elongated hanger element 18 so card 36 is mounted on the elongated hanger element.

The second panel 60 includes a second circular opening 68 (FIG. 5) having substantially the same diameter and shape as the portion of wall 46 immediately below lid 50 and slightly less than the diameter of the flange 52 of lid 50. Opening 68 receives and holds container 38 with hooks 40 stored therein. Container 38 is positioned in the second opening 68 so (1) lid 50 bears against a face of first panel 58 that faces second panel 60, (2) lid 50 is captured between the facing faces of panels 58 and 60, and (3) most of body 42 of container 38 extends from second panel 60 in a direction away from first panel 58. The first panel 58 also includes a third, semicircular opening 70, which is in front of approximately one-half of lid 50.

Staple 64 extends through abutting, parallel, vertical faces of portions 72, 74 of first and second panels 58 and 60 which are above openings 68, 70 while card 36 is hanging on hanger 18. Portion 74 is connected to the remainder of second panel 60 by ledge 76 which is horizontal while card 36 is hanging on hanger 18. Staple 64 secures panels 68 and 70 to each other so the second and third openings 68, 70 are arranged so a segment of the transparent lid 50 and the hooks 40 in the container 38 can be seen by the prospective purchaser through the second and third openings and the lid while the card 36 is carried by the elongated hanger element 18. Only a first segment of lid 50 is behind the third opening 70 and the remainder of the lid bears against a back face of the first panel 58 (i.e., the face of the first panel facing the second panel 60) to assist in holding the container 38 in place on the card 36.

Because lid 50 is optically transparent and at least a portion of the lid is visible to a prospective purchaser through semicircular opening 70, the prospective purchaser of hooks 40 can see the hooks through the transparent lid while point of sale device 32 is mounted on the horizontally extending elongated hanger element 18 and/or after the container 38 has been removed from the horizontally extending hanger element 18.

Figure 6:
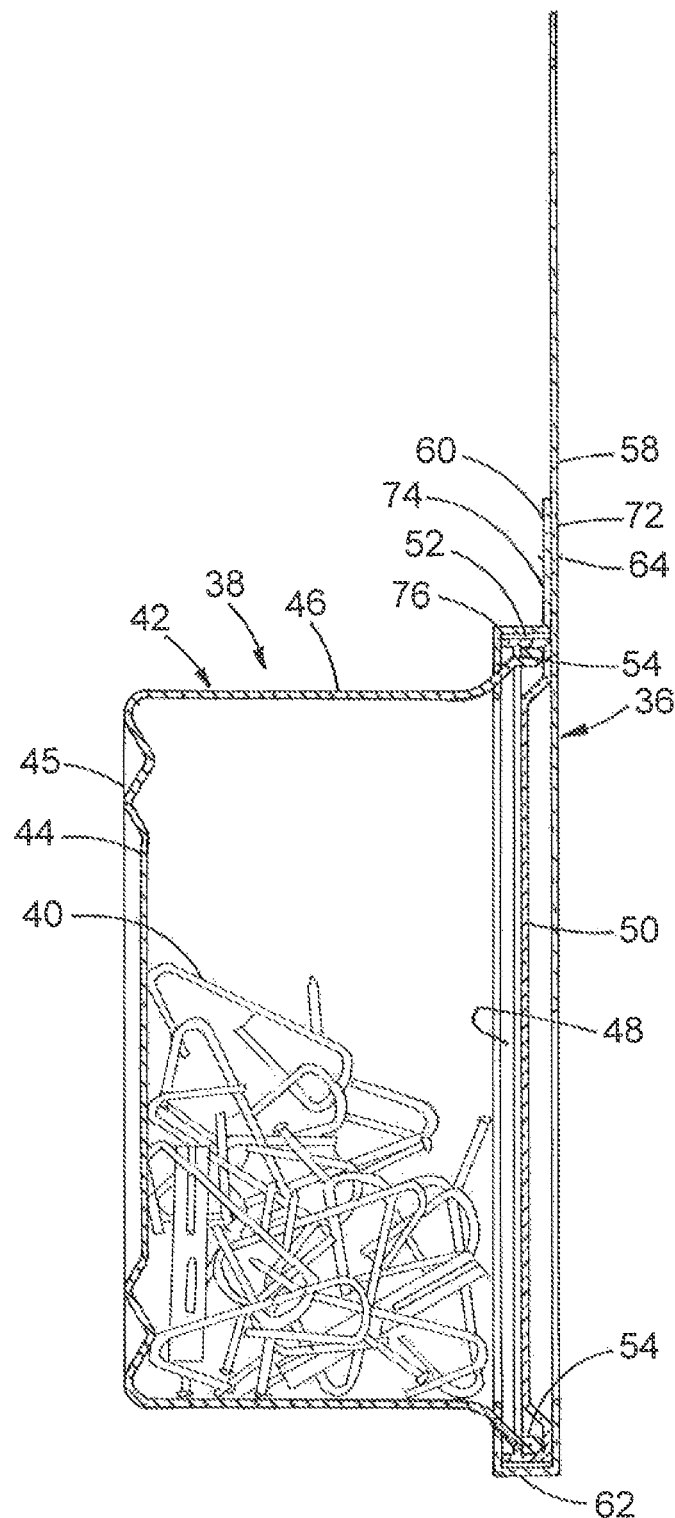
FIG. 6 is a side sectional view taken through the line 6-6 of FIG. 2.

While card 36 is carried by elongated hanger element 18, hooks 40 are piled against the lowest portion of container 42 and against lid 50, as illustrated in FIG. 6. In some situations such piling makes hooks 40 difficult to be clearly perceived by the prospective purchaser.

Hooks 40 and other articles including magnetic material that can be put into container 42 are more evenly spatially distributed in the container by inserting disc shaped permanent magnet 78 (FIG. 7) in the container. The more even spatial distribution of the hooks 40 in the container 42 enables the articles to be more clearly perceived by a prospective purchaser while card 36 is carried by container 42. Magnet 78 has a diameter slightly less than the interior diameter of wall 46 in the vicinity of base 44, and is placed in container 42 so the permanent magnet abuts base 44 and the edges of the magnet are very close to the portion of wall 46 next to the base.

Magnet 78 is polarized through its thickness so the first and second opposite north and south poles thereof are respectively on the face of the magnet facing base 44, and on the opposite, parallel face of the magnet facing lid 50. Because base 42 is made of magnetic material (e.g., steel), magnet 78 is held in place on the base.

Figure 7:
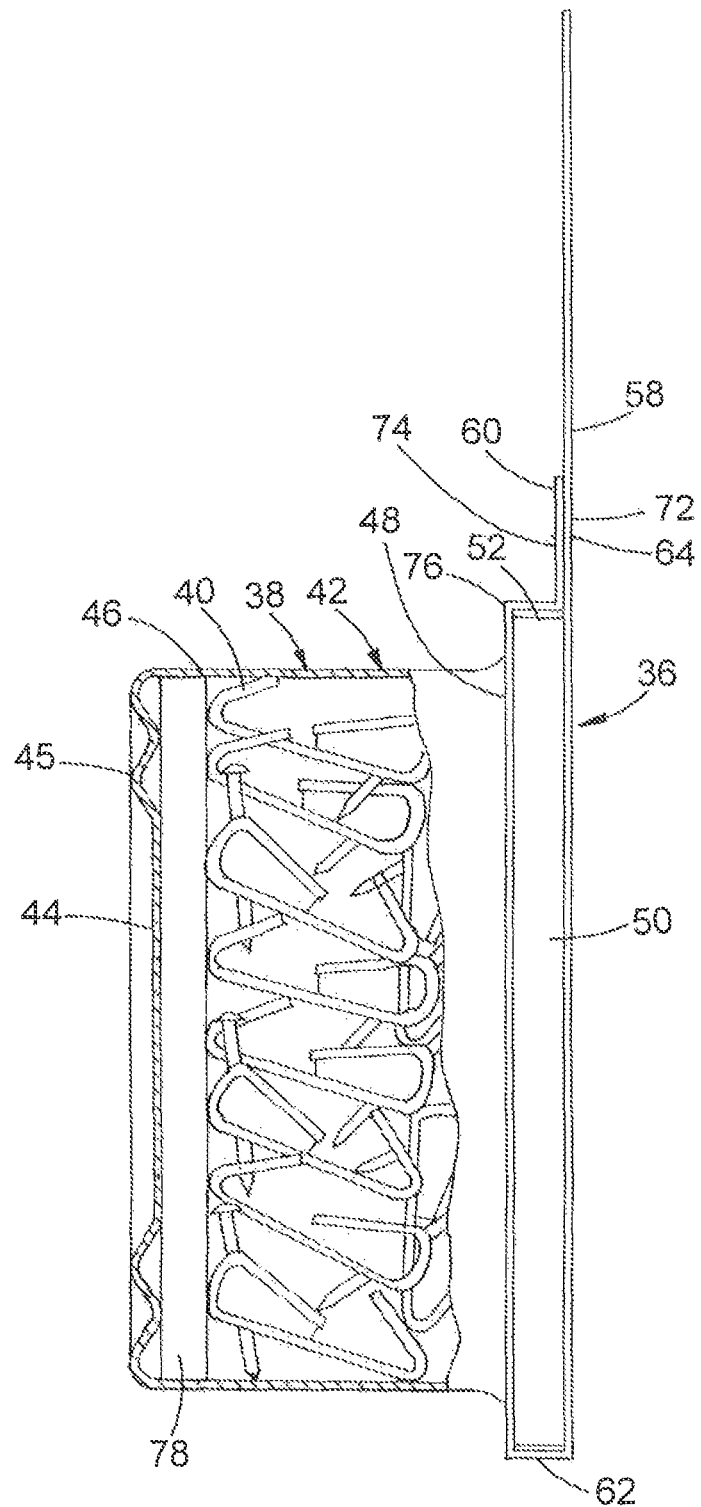
FIG. 7 is a partial side sectional view of another embodiment of a point of sale device that can be used with the pegboard and hanger of FIG. 1, wherein the device includes a container with a permanent magnet.

Because at least a portion of hooks 40 is magnetic (e.g., steel), the force of gravity is overcome by the magnetic force exerted on the hooks by the magnetic field from magnet 78 and the hooks are distributed evenly in container 42, as illustrated in FIG. 7. The magnetic field from magnet 78 is coupled through the hooks 40 that bear against the magnet so the hooks that are spaced from the magnet, and do not touch magnet 78, even the hooks which bear against lid 50, are held in place by the magnetic force coupled to them from magnet 78. Because container 42 is made of magnetic material (e.g., steel) and lid 50 is made of non-magnetic material, there are strong magnetic lines of flux throughout container 42 to assist in providing the even spatial distribution.

While one use of the container of FIG. 7 is in connection with point of sale device 32, it is to be understood that the permanent magnet bearing container illustrated in FIG. 7 can be used for other purposes, e.g., to store articles containing magnetic material in a safe and clean environment.

While there have been described and illustrated specific embodiments of the invention, it will be clear that variations in the details of the embodiments specifically illustrated and described may be made without departing from the true spirit and scope of the invention as defined in the appended claims.

What is claimed is:

1. A point of sale device for articles to be sold at a retail shop, the point of sale device comprising:
   a card adapted to be mounted on a horizontally extending elongated element of a vertically extending mounting structure of the retail shop, wherein the card comprises:
      a first panel,
      a second panel comprising a first planar surface in a first plane, a second planar surface extending from the first planar surface in a second plane different from the first plane, and a third planar surface extending from the second planar surface in a third plane different from the first plane and the second plane, the third planar surface being configured to contact the first panel, and
      a narrow ridge connecting the first panel to the second panel, wherein the narrow ridge has a first end connected to the first panel, a second end connected to the second panel, and extends in a direction perpendicular to the first panel and the second panel,
   the card carrying a reusable storage container in which the articles are stored,
   the container having a body including an opening closed by a sealable, removable and re-sealable lid while the device is on the vertically extending mounting structure,
   the container being mounted on the card while the articles are stored in the container and the device is mounted on the horizontally extending elongated element.

2. The point of sale device of claim 1 wherein the lid is transparent so a prospective purchaser of the container including the articles can see the articles through the transparent lid while the device is mounted on the horizontally extending elongated element.

3. The point of sale device of claim 2 wherein at least one of the panels including a first opening for receiving the elongated element and for enabling the card to be mounted on the elongated element, the second panel including a second opening that receives and holds the container with the articles stored therein, the container being in the second opening so the lid bears against a face of the first panel facing the second panel and most of the body extends beyond the second panel in a direction away from the first panel, the first panel including a third opening, the first and second panels being folded relative to each other so the second panel is folded behind the first panel, the first and second panels being secured to each other so the second and third openings are arranged so at least a portion of the transparent lid and articles in the container can be seen by the prospective purchaser through the third and second openings and the lid while the card is carried by the elongated element.

4. The point of sale device of claim 3 wherein the perimeter of the second opening has substantially the same shape and length as the exterior perimeter of the body and the lid has an exterior perimeter that has substantially the same shape and is somewhat larger in length than the perimeter of the second opening so that the container is held in place between facing faces of the first and second panels while the container is on the card.

5. The point of sale device of claim 4 wherein a fastener holds the first and second panels in the secured relationship, the fastener connecting a segment of the first panel between the first and third openings to a region of the second panel remote from where the panels are joined.

6. The point of sale device of claim 3 wherein a fastener holds the first and second panels in the secured relationship, the fastener connecting a segment of the first panel between the first and third openings to a region of the second panel remote from the where the panels are joined.

7. The point of sale device of claim 1, wherein the body of the container comprises:
   at least one sidewall;
   a base connected to an end of the at least one sidewall, the base comprising a plurality of strengthening ribs; and
   a bead extending from an end of the at least one sidewall opposite the base.

8. The point of sale device of claim 7, wherein the lid is configured to fit over the bead.

9. The point of sale device of claim 3, wherein the third opening is configured to display approximately half of the lid.

10. The point of sale device of claim 1, wherein
   the second planar surface is a horizontal portion of the second panel extending substantially parallel to the narrow ridge; and
   the third planar surface is a vertical portion of the second panel extending from the horizontal portion in a direction away from the narrow ridge.

11. The point of sale device of claim 10, further comprising a fastener configured to attach the first panel to the second panel at the vertical portion of the second panel.

12. The point of sale device of claim 1, wherein the container further comprises a magnet positioned within the container.

13. The point of sale device of claim 12, wherein the magnet is a permanent magnet.

14. The point of sale device of claim 13, wherein the magnet is configured to evenly distribute the articles within the container.

15. A point of sale device for articles to be sold at a retail shop, the point of sale device comprising:

a card adapted to be mounted on a horizontally extending elongated element of a vertically extending mounting structure of the retail shop, the card comprising:
  a first panel,
  a second panel comprising a first planar surface in a first plane, a second planar surface extending from a first side of the first planar surface in a second plane different from the first plane, and a third planar surface extending from the second planar surface in a third plane different from the first plane and the second plane, the third planar surface being configured to contact the first panel, and
  a narrow ridge connecting the first panel to the second panel, the narrow ridge being connected to the first planar surface of the second panel on a second side of the first planar surface of the second panel opposite the first side of the first planar surface,
the card carrying a reusable storage container in which the articles are stored,
the container having a body including an opening closed by a sealable, removable and re-sealable lid while the device is on the vertically extending mounting structure,
the container further having a magnet disposed within the container, and
the container being mounted on the card while the articles are stored in the container and the device is mounted on the horizontally extending elongated element.

16. The point of sale device of claim 15, wherein
the narrow ridge extends in a direction perpendicular to the first panel and the first planar surface of the second panel.

17. The point of sale device of claim 16, wherein
the second planar surface is a horizontal portion of the second panel extending substantially parallel to the narrow ridge; and
the third planar surface is a vertical portion of the second panel extending from the horizontal portion in a direction away from the narrow ridge.

18. The point of sale device of claim 17, further comprising a fastener configured to attach the first panel to the second panel at the vertical portion of the second panel.

19. A point of sale device for articles to be sold at a retail shop, the point of sale device comprising:
  a card adapted to be mounted on a horizontally extending elongated element of a vertically extending mounting structure of the retail shop, wherein the card comprises:
    a first panel, having a first opening,
    a second panel comprising a first planar surface in a first plane, a second planar surface extending from the first planar surface in a second plane different from the first plane, and a third planar surface extending from the second planar surface in a third plane different from the first plane and the second plane, wherein at least one of the first panel or the second panel has a second opening configured to receive the elongated element, and
    a fastener configured to hold the first and second panels in a secured relationship, the fastener configured to connect a segment of the first panel between the first and second openings to the third planar surface of the second panel,
the card carrying a reusable storage container in which the articles are stored,
the container having a body including an opening closed by a sealable, removable and re-sealable lid while the device is on the vertically extending mounting structure,
the container being mounted on the card while the articles are stored in the container and the device is mounted on the horizontally extending elongated element.

20. The point of sale device of claim 19, wherein the card further comprises a narrow ridge connecting the first panel to the second panel, wherein the narrow ridge extends in a direction perpendicular to the first panel and the first planar surface of the second panel.

\* \* \* \* \*